United States Patent
Fontaine

(10) Patent No.: US 7,265,358 B2
(45) Date of Patent: Sep. 4, 2007

(54) DEVICE TO PREVENT THE RISK OF OVEREXPOSURE TO HARMFUL SOLAR RADIATION

(75) Inventor: Michel Fontaine, Paris (FR)

(73) Assignee: L'Oreal, Paris (FR)

( * ) Notice: Subject to any disclaimer, the term of this patent is extended or adjusted under 35 U.S.C. 154(b) by 46 days.

(21) Appl. No.: 10/895,840

(22) Filed: Jul. 22, 2004

(65) Prior Publication Data

US 2005/0067580 A1    Mar. 31, 2005

Related U.S. Application Data

(60) Provisional application No. 60/493,788, filed on Aug. 11, 2003.

(30) Foreign Application Priority Data

Jul. 23, 2003    (FR) ................... 03 08998

(51) Int. Cl.
*G01J 5/00*    (2006.01)
(52) U.S. Cl. ................... 250/372; 250/338.1; 250/365; 250/370.07; 250/330
(58) Field of Classification Search ................ 250/372, 250/365, 370.07, 330
See application file for complete search history.

(56) References Cited

U.S. PATENT DOCUMENTS

| | | |
|---|---|---|
| 3,710,115 A | 1/1973 | Jubb |
| 4,212,932 A * | 7/1980 | Calgari et al. ............... 429/111 |
| 4,535,244 A | 8/1985 | Burnham |
| 4,863,282 A | 9/1989 | Rickson |
| 5,091,995 A | 3/1992 | Oates |
| 5,378,896 A | 1/1995 | Knjaschewitsch et al. |
| 5,686,727 A | 11/1997 | Reenstra et al. |
| 5,986,273 A | 11/1999 | Tripp et al. |
| 6,132,681 A | 10/2000 | Faran et al. |
| 2003/0226978 A1* | 12/2003 | Ribi et al ................. 250/474.1 |

FOREIGN PATENT DOCUMENTS

| | | |
|---|---|---|
| JP | 54-16613 | 2/1979 |
| JP | 63-42124 | 3/1988 |
| JP | 4-89514 | 8/1992 |
| JP | 3064772 | 9/1999 |
| WO | WO91/04469 | 4/1991 |

* cited by examiner

*Primary Examiner*—David Porta
*Assistant Examiner*—Djura Malevic
(74) *Attorney, Agent, or Firm*—Oblon, Spivak, McClelland, Maier & Neustadt, P.C.

(57) ABSTRACT

A device intended to reduce the risks of overexposure to harmful solar radiation. The device includes a detection arrangement, including at least one sensor sensitive to solar radiation, in particular UV. In addition, an arrangement is linked to the detection arrangement to generate a signal representing the quantity of radiation received by the detection means. An attachment arrangement is provided to attach the device to the head of a subject, such that the sensor(s) is (are) oriented in a substantially perpendicular manner to the vertical plane of the subject when the latter is active in the sun. The device is preferably configured in the form of a cap, with the detection arrangement arranged on a first visor intended to be positioned over the back of the individual's neck. The cap also preferably includes a second visor located opposite the first.

59 Claims, 2 Drawing Sheets

DEVICE TO PREVENT THE RISK OF OVEREXPOSURE TO HARMFUL SOLAR RADIATION

CROSS REFERENCE TO RELATED APPLICATIONS

This document claims priority to French Application Number 03 08998, filed Jul. 23, 2003 and U.S. Provisional Application No. 60/493,788, filed Aug. 11, 2003, the entire contents of which are hereby incorporated by reference.

FIELD OF THE INVENTION

The present invention concerns a device for the detection of solar radiation, in particular ultraviolet or infrared, for the purpose of preventing or reducing risks of overexposure to harmful solar rays. By way of example, the invention can be particularly advantageous for children.

BACKGROUND OF THE INVENTION

Discussion of Background

It has been clinically proven that exposure of the human body to solar radiation significantly increases the risks of developing skin cancer. Hitherto, the prevention of skin cancer has been accomplished by the use of products based on sunscreens allowing prolonged exposure to the sun. Despite their acknowledged effectiveness in protecting the skin against harmful solar rays, these products have limited effectiveness over time. The effectiveness of these products can be further reduced by perspiration or by the performance of certain physical activities, such as swimming. In addition, irrespective of whether or not physical activity is performed by the subject, the activity of sun protection products can also be degraded by the UV radiation.

Such sunscreen products therefore have to be applied regularly at variable intervals depending on the activity exercised by the individual concerned, their skin type, or the degree of exposure to sunlight. In practice, subjects simply forget to re-apply the product. In other cases, the subject has difficulty in estimating the frequency of application depending on the level of exposure to the sun in relation to the time of day or variations in conditions from day to day. The frequency of application of these products also varies as a function of skin type.

There is therefore a need for a system to indicate to the subject exposed to the sun, in a simple and effective manner, when a fresh application of a protection product must be made, or when exposure to the sun should be stopped.

Devices exist that can be used to measure the quantity of solar radiation received. Such devices are either in form of somewhat bulky units, for example installed on beaches and available to everyone, or in a form the subject can carry around such as a system worn like a watch. Alternatively, the device can be integrated into the packaging of a sun protection product.

Devices of this kind are described in U.S. Pat. Nos. 5,986,273, 5,378,896, 4,535,244, 3,710,115, 4,863,282, or WO 91/04469. These systems use either photocells, or photochromic or thermochromic compositions, arranged in one or more zones, which change color in relation to the quantity of radiation received. A major problem inherent with these systems is that the information they provide about the quantity of radiation received often does not correspond to the quantity actually received by an individual located more or less distant from the detection system. The individual can be exposed in a manner often quite different from the exposure to which the sensor of the device is subjected. The same applies to systems worn like a watch, which by virtue of the average orientation relative to the sun's rays, generally give readings that are well below the actual level of exposure of the user.

U.S. Pat. No. 6,132,681 describes a known indicator used to measure a received quantity of UV radiation, with the indicator being capable of attachment to the clothing. A problem apparent even with this type of indicator lies in the fact that it is placed on a part of the clothing which does not necessarily correspond to the area of the body most intensely exposed to solar radiation, and therefore the reading provided by this applicator is well below the actual level.

With such known arrangements, the user is ultimately placed at great risk in that he/she is inadequately protected, having been warned too late of the need for more effective protection, for example by applying a fresh layer of sun protection cream or simply by moving into the shade. The danger is even greater for children.

SUMMARY OF THE INVENTION

One of the objects of the invention is to provide a device designed to reduce the risks associated with overexposure to harmful solar radiation, and which wholly or partially resolves the problems described above in reference to known detection devices.

Another object of the invention is to provide a device incorporating means of detection whose average orientation relative to the solar radiation is such that it provides the wearer with more reliable information, enabling the risks of overexposure to be significantly reduced.

A further object of the invention is to provide a device that is simple and effective, and which does not impose excessive constraints on the wearer.

Further objects will become apparent from the detailed description which follows.

According to the invention, these objects are achieved by providing a device to reduce the risks associated with overexposure to harmful solar radiation. In accordance with a preferred arrangement, the device includes:

i) a detection arrangement, including at least one sensor sensitive to at least one type of solar radiation, preferably UV;

ii) an arrangement linked or connected to the detection means to generate a signal representing the quantity of radiation received by the detection means, and iii) an arrangement for attaching the device to the head of a subject so that the sensor(s) can be oriented in a manner substantially perpendicular to the vertical plane of the individual when the individual is standing.

In accordance with a preferred example, the device is configured in the form of a cap, with the detection arrangement (12) being arranged on a first visor (4) designed to be positioned over the back of the individual's neck. The cap preferably also includes a second visor (3) located opposite the first.

In a surprising manner, the applicant effectively discovered that, with devices arranged as described herein, the detection arrangements were exposed in a substantially perpendicular manner to the solar radiation when the subject adopts a variety of different positions as well as the standing position. This is particularly the case when the subject is sitting, kneeling, or in a crouched position, which are positions frequently adopted by children when they are playing on the beach.

Devices as disclosed herein can reduce the risk that the quantity of radiation received by the sensors is lower than the quantity of radiation to which the subject is effectively exposed. Therefore, the risk of overexposure of the subject for this reason is significantly diminished.

The signal generated in response to exposure of the sensor can be visual and/or audible. The arrangement for generating the signal can be separate from the detection arrangement. By way of example, the detection arrangement can include a photocell, for example a photovoltaic cell, which converts solar radiation into electrical current. The electrical current can then heat a resistance element associated with or itself forming a thermochromic system linked to one or more segments of a display device which change color successively as a function of temperature.

By way of example, the photochromic segments of the display device can be arranged in a row. Purely by way of illustration, the first segments in the row can contain a compound which turns green when a temperature T0 is reached. The following segments can contain another thermochromic compound which turns orange when a temperature T1>T0 is reached. The last segment in the row can contain a further thermochromic compound which turns red when a temperature T2>T1 is reached. When the last segment turns red, this tells the subject and/or persons with them that it is time to re-apply a protection product.

Advantageously, the transition to red of the last segment of the display device may be accompanied by the emission of an audible alarm which can be heard by the subject and/or by persons close to them. The audible alarm, for example in the form of a succession of "beeps", can also be used independently of any visual signal.

In a more sophisticated embodiment, the system can be associated with means to allow the sun protection factor (SPF) to be keyed in for a sunscreen product which may have been used by the subject. The SPF, together with the quantity of radiation received, is processed by a computer to determine the time when a sufficient quantity of solar radiation has been received by the subject, such that the application of a sunscreen product allows more prolonged exposure compared with the exposure allowed in the absence of a protection product. Similarly, the application of a product with a high SPF may, depending on the circumstances, allow a longer exposure time than that allowed if the product applied has a low SPF.

In another embodiment, the detection arrangement itself can generate the signal representing the quantity of radiation received. In this case, the signal generated will preferably be a visual signal. Thus, the detection system can include one or more areas incorporating dyes or photochromic colorants which change color in a reversible manner in response to exposure to ultraviolet radiation. Typically, such dyes can be activated by UV radiation having a wavelength in the range 300 to 360 nm for example. Thus, the sensor or detection devices can also include the signal generation device, or as discussed earlier, the signal generation or display can be separate from and coupled or connected to the detection arrangement. As used herein, reference to the arrangement to generate a signal as being "linked" to the detection or sensor arrangement is intended to encompass both the case where the detection and signal generation or display are integral or part of the same device and also the case where the detection and signal generation are separate devices that are connected to each other.

Different pigments and different types of photochromic dyes can be used and combined so as to react and change color after a certain time or at a certain level of exposure to UV radiation. By way of example, a photochromic dye of this kind is sold under the brand name PHOTOSOL® by PPG Industries Inc. The photochromic dye can be dispersed in a polymer structure. By way of example, a product of this kind is marketed under the brand name PLASTISOL® by CIT Industries.

Alternatively, the compositions used in the area(s) of detection can contain fluorescent constituents capable of absorbing UV radiation of a certain wavelength and re-emitting at a different wavelength.

According to another alternative, the area(s) of detection can include thermochromic liquid crystals which react to temperature. The detection/display cell can include a plurality of zones each including compositions based on mixtures of different liquid crystals each reacting to different temperatures, arranged to "fire" successively depending on the quantity of infrared radiation received.

Advantageously, the device according to the invention is configured in the form of a cap (with or without crown, e.g., a visor) or a hat of the type incorporating a relatively rigid rim surrounding the end of the hat opposite the crown. The portion of the cap or hat completely covering the head (or partially in the case of a cap without a crown) therefore serves as an attachment arrangement for the detection device such that the latter is positioned correctly relative to the solar radiation.

In a conventional manner, the cap can include means, in particular in the form of one or more elastic strips or in the form of an adjustable fastening system, to better enable the cap to be held securely on the head.

In the case of a cap, the detection arrangement can be mounted on a first visor intended to be positioned over the back of the individual's neck. Advantageously, the cap also preferably includes a second visor located opposite the first. The second visor can be used conventionally to protect the face, and in particular the eyes, from the sun, and can also serve as a reference to ensure correct positioning of the first visor to which the sensors are fitted.

In accordance with another aspect, the invention provides a cap which includes:
i) a portion intended to attach the cap to the head of an individual;
ii) a first visor intended to be positioned substantially over the back of the subject's neck, with the first visor being equipped with a detection arrangement including at least one sensor sensitive to at least one type of solar radiation, such as UV, and an arrangement linked to the detection arrangement to generate a signal representing the quantity of radiation received by the detection arrangement; and
iii) a second visor located opposite the first.

BRIEF DESCRIPTION OF THE DRAWINGS

The invention will become further apparent from the following detailed description, particularly when considered in conjunction with the drawings in which.

DETAILED DESCRIPTION OF THE PREFERRED EMBODIMENTS

Figure 1:
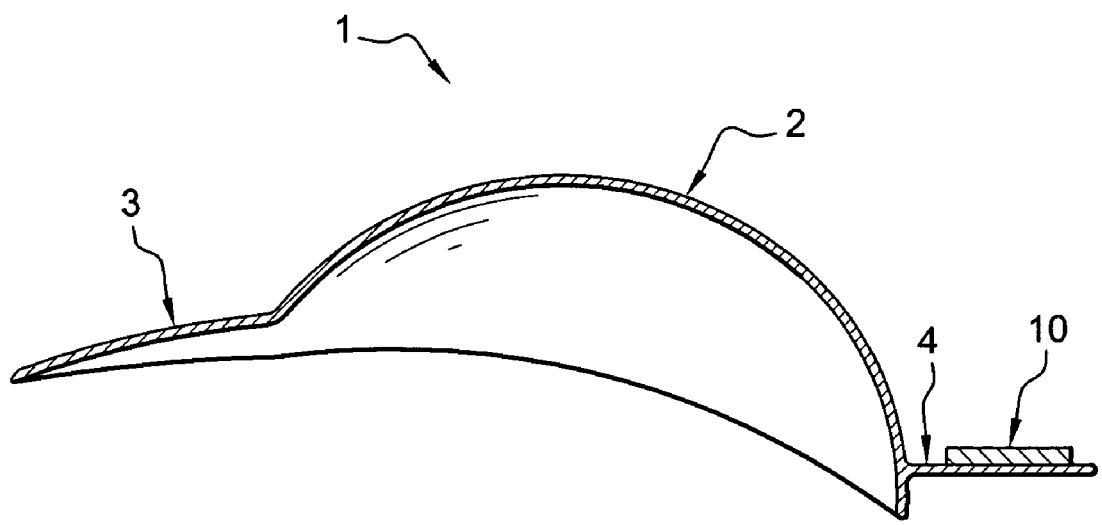
FIG. 1 illustrates a cap constituting a preferred embodiment of the device according to the invention.

FIG. 1 illustrates an example of a device according to the invention. The device includes a cap 1 having a portion made, e.g., of woven fabric 2 intended to fit snugly over the skull of a subject, in particular a child. The cap 1 includes a visor 3 (made, e.g., of thick cardboard or plastic covered in fabric) intended to be positioned conventionally over the subject's face.

Opposite the visor 3, the cap 1 includes another visor 4 on the upper surface of which is arranged a detection/display unit 10 which will be described in detail with reference to FIG. 2. The shape of the detection/display device 10 can be, for example, similar to that of a credit card.

The device 10 can be attached to the visor 4 in an irreversible manner, or more preferably, in a reversible manner. In the latter case, the device 10 can be attached, for example, with VELCRO® type (hook and loop) fasteners. Thus, the device 10 can be removed before cleaning the cap.

Figure 3:
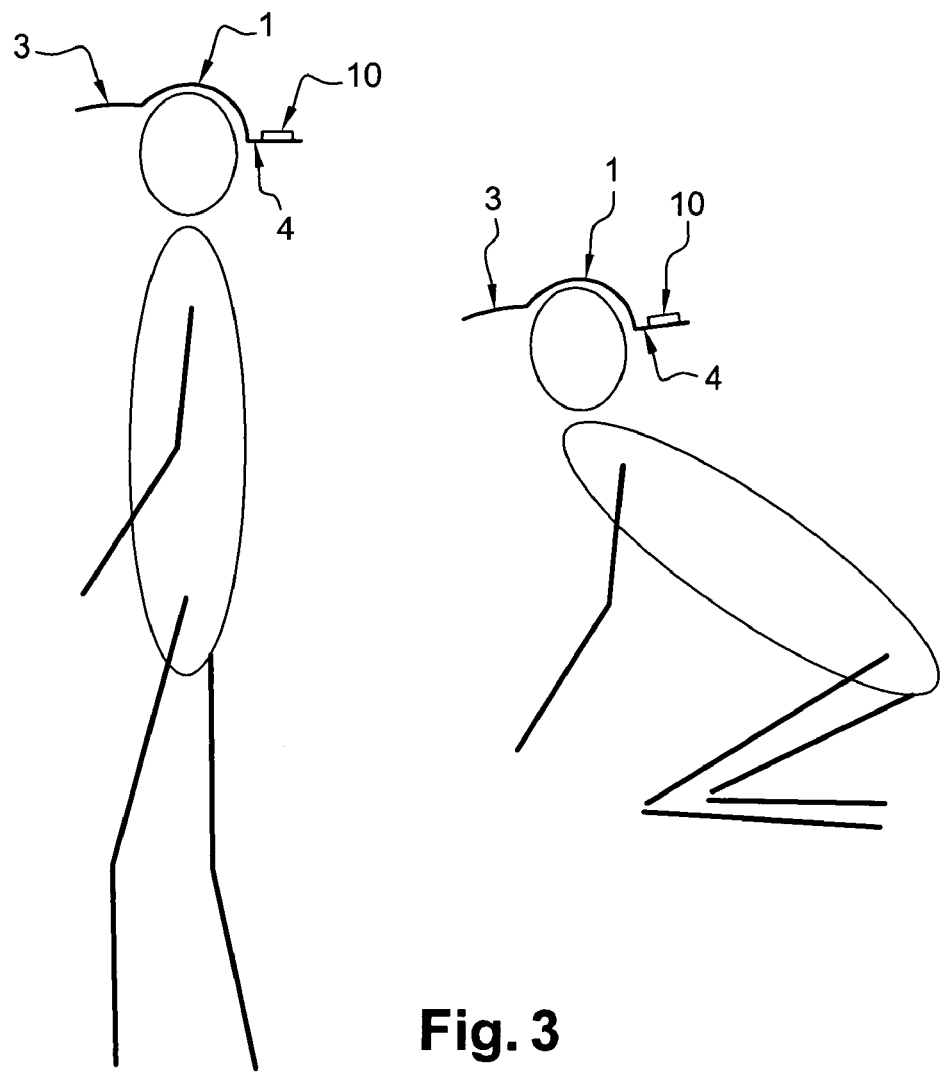
FIG. 3 illustrates the position of the detection/display device in FIG. 2 in relation to two positions of the subject of which one is other than a standing position.

The visor 4 can be made of a material identical to that of the visor 3 and is intended to be positioned over the back of the subject's neck. Its shape and dimensions are chosen so as to limit any hindrance that may be caused, for example, when the subject is in a position other than standing, as shown in FIG. 3 and discussed hereinafter.

Figure 2:
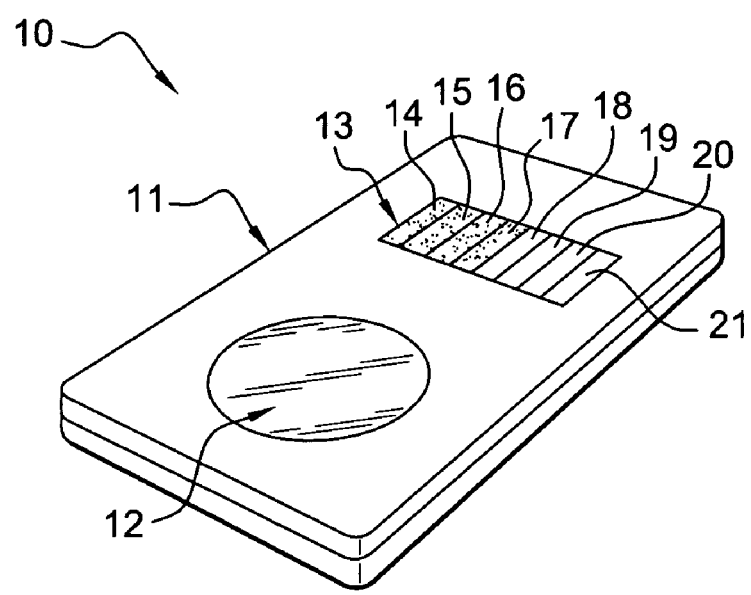
FIG. 2 illustrates an embodiment of the detection/display system fitted to the cap in FIG. 1.

The detection/display device 10 illustrated in FIG. 2 includes a plastic support 11 having the shape and size of a credit card. The support 11 includes two superimposed plastic plates between which the detection and display arrangement or system is arranged. The upper plate includes a first window in which is placed the active part of a photocell 12, and a second window in which a display unit 13 is mounted.

The photovoltaic cell 12 is connected by means of a suitable electronic linkage to the display unit 13. The display unit 13 preferably includes a plurality of areas 14-21 capable of changing color successively as a function of the temperature to which they are brought, via one or more resistances traversed by the current generated by the photovoltaic cell 12.

The first areas 14-18 in the row can contain a thermochromic liquid crystal compound which turns green when a temperature, for example of approximately 35° C., is reached. The following areas 19-20 contain another thermochromic liquid crystal compound which turns orange when another temperature, for example of approximately 45° C., is reached. The last area 21 in the row contains a further thermochromic compound which turns red when a further temperature, for example of approximately 55° C., is reached. When the last area 21 turns red, this tells the subject that it is time to re-apply a protection product.

Compositions based on such mixtures of thermochromic liquid crystals are described in particular in U.S. Pat. No. 4,863,282 to which reference has been made previously and which is incorporated herein by reference.

As can be seen in FIG. 3, whether the subject is standing, crouched or kneeling, the surface of the rear visor 4 of the cap 1 remains substantially horizontal and parallel to the ground. For this reason, the sensor of the detection/display unit 10 is better oriented, preferably substantially perpendicular to the solar radiation.

Thus, contrary to conventional systems which generally provide "underestimated" information about the quantity of radiation effectively received by the subject, the device according to the invention gives information substantially corresponding to the maximum exposure to which the subject may have been exposed.

Figure 4:
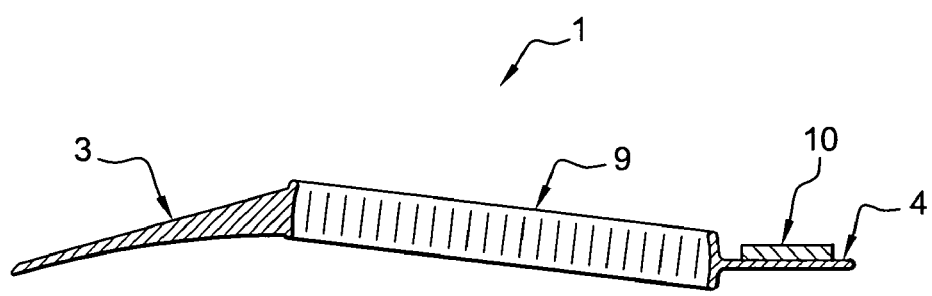
FIG. 4 illustrates a variant of FIG. 1.

According to the variant in FIG. 4, the cap 1 has no crown and essentially comprises a head band 9, for example made of plastic, intended to surround the head. The head band 9 is fitted with two visors 3 and 4 described with reference to the previous embodiment. Thus, the cap of the invention can be provided as a head band or visor type cap. Alternately, the cap could be provided with a brim extending around all or portions of the head such that the brim provides a first visor at the rear and a second visor at the front of the cap.

In the foregoing detailed description reference has been made to preferred embodiments of the invention. It is evident that variants thereto can be proposed without departing from the spirit of the invention as claimed below. Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A device to reduce the risks of overexposure to harmful solar radiation comprising:
   i) detection means including at least one sensor sensitive to at least one type of solar radiation;
   ii) means to generate a signal representing a quantity of radiation received by the detection means, wherein the means to generate a signal are linked to the detection means, and
   iii) means for attaching the device to the head of an individual so that the at least one sensor can be oriented in a manner substantially perpendicular to a vertical plane of the individual when the individual is standing, wherein the device is configured in the form of a cap, with the detection means being arranged on a first visor configured to be positioned over the back of the individual's neck, and wherein the cap further includes a second visor located opposite the first visor.

2. A device according to claim 1, wherein the signal is a visual signal.

3. A device according to claim 1, wherein the signal is an audible signal.

4. A device according to claim 1, wherein the means to generate a signal generates both a visual signal and an audible signal.

5. A device according to claim 1, wherein the means to generate a signal are separate from the detection means.

6. A device according to claim 5, wherein the detection means includes a photocell.

7. A device according to claim 6, wherein the photocell is a photovoltaic cell.

8. A device according to claim 1, wherein the detection means generates the signal representing the quantity of radiation received.

9. A device according to claim 1, wherein the means to generate a signal includes at least one area including a composition containing at least one photochromic compound.

10. A device according to claim 1, wherein the means to generate a signal includes at least one area including a composition containing at least one thermochromic compound.

11. A device according to claim 1, wherein the means to generate a signal includes liquid crystals.

12. A device according to claim 1, wherein the means to generate a signal includes at least one florescent compound.

13. A device according to claim 1, wherein the at least one sensor is sensitive to UV radiation.

14. A device according to claim 1, wherein the means to generate a signal generates a plurality of different signals depending upon a quantity of radiation received.

15. A device according to claim 14, wherein the plurality of different signals include a plurality of different colors.

16. A device according to claim 14, wherein the plurality of different signals includes a first color which is displayed after a first amount of radiation is received and a second color which is displayed after a second amount of radiation is received and wherein said second amount is greater than said first amount.

17. A device according to claim 16, wherein the plurality of different signals further includes a third color which is displayed after a third amount of radiation is received and wherein said third amount is greater than said second amount.

18. A device according to claim 17, wherein the means to generate a signal includes a plurality of display elements.

19. A device according to claim 18, wherein said plurality of display elements are arranged in a row, and wherein each of said display elements displays one of said first, second, and third colors.

20. A device according to claim 19, wherein at least one of said first, second, and third colors is displayed by more than one of said plurality of display elements.

21. A device according to claim 1, wherein the detection means includes a photovoltaic cell that converts solar radiation into electric current that heats a thermochromic system which changes color as a function of temperature change.

22. A device according to claim 1, wherein the means to generate a signal includes a computer that determines when a quantity of radiation has been received by the individual based on a sun protection factor entered into the computer and a quantity of radiation received by the detection means, wherein when the computer determines a specified quantity of radiation has been received, the computer generates a signal detectable by the individual.

23. A device according to claim 1, wherein the means to generate a signal generates a change in color in an area of the at least one sensor, and the color change is reversible.

24. A device according to claim 1, wherein the means to generate a signal includes a plurality of zones, each zone includes compositions based on mixtures of different liquid crystals, and each zone is configured to react to different temperatures and to create a signal when a different quantity of infrared radiation is received by the detecting means.

25. A cap comprising:
  i) a portion configured to attach the cap to the head of a subject;
  ii) a first visor configured to be positioned substantially over the back of the subject's neck, wherein the first visor is equipped with detection means including at least one sensor sensitive to at least one type of solar radiation, and means to generate a signal representing a quantity of radiation received by the detection means, and wherein the means to generate a signal is linked to the detection means; and
  iii) a second visor located substantially opposite the first.

26. A cap according to claim 25, wherein the at least one sensor is sensitive to UV radiation.

27. A cap according to claim 25, wherein the signal is a visual signal.

28. A cap according to claim 25, wherein the signal is an audible signal.

29. A cap according to claim 25, wherein the means to generate a signal generates a plurality of different signals depending upon a quantity of radiation received.

30. A cap according to claim 29, wherein the plurality of different signals include a plurality of different colors.

31. A cap according to claim 29, wherein the plurality of different signals includes a first color which is displayed after a first amount of radiation is received and a second color which is displayed after a second amount of radiation is received and wherein said second amount is greater than said first amount.

32. A cap according to claim 31, wherein the plurality of different signals further includes a third color which is displayed after a third amount of radiation is received and wherein said third amount is greater than said second amount.

33. A cap according to claim 32, wherein the means to generate a signal includes a plurality of display elements.

34. A cap according to claim 33, wherein said plurality of display elements are arranged in a row, and wherein each of said plurality display elements displays one of said first, second, and third colors.

35. A cap according to claim 34, wherein at least one of said first, second, and third colors is displayed by more than one of said plurality of display elements.

36. A cap according to claim 25, wherein said first visor extends such that when the cap is placed on the subject's head the first visor extends perpendicular to a vertical plane when the subject is standing.

37. A device according to claim 25, wherein the at least one sensor includes a photovoltaic cell that converts solar radiation into electric current that heats a thermochromic system which, changes color as a function of temperature change.

38. A device according to claim 25, wherein the means to generate a signal includes a computer that determines when a quantity of radiation has been received by the individual based on a sun protection factor entered into the computer and a quantity of radiation received by the detection means, wherein when the computer determines a specified quantity of radiation has been received, the computer generates a signal detectable by the individual.

39. A device according to claim 25, wherein the means to generate a signal generates a change in color in an area of the at least one sensor, and the color change is reversible.

40. A device according to claim 25, wherein the means to generate a signal includes a plurality of zones, each zone includes compositions based on mixtures of different liquid crystals, and each zone is configured to react to different temperatures and to create a signal when a different quantity of infrared radiation is received by the detecting means.

41. A cap comprising:
  i) a portion configured to attach the cap to the head of a subject;
  ii) a first visor;
  iii) at least one sensor positioned on said first visor, wherein said at least one sensor is sensitive to at least one type of solar radiation;
  iv) an indicator linked to said at least one sensor, wherein said indicator provides a signal indicating an amount of radiation received by said at least one sensor.

42. A cap according to claim 41, wherein said cap further includes a second visor, and wherein said second visor is positioned at a front of said cap and said first visor is positioned at a rear of said cap such that said first visor extends over at least part of subject's neck when the cap is positioned on the subject's head.

43. A cap according to claim 42, wherein said first visor extends substantially perpendicular to a vertical plane when the cap is placed on the subject's head and the subject is standing.

44. A cap according to claim 41, wherein said first visor extends substantially perpendicular to a vertical plane when the cap is placed on the subject's head and the subject is standing.

45. A cap according to claim 41, wherein said indicator provides a plurality of different signals depending upon a quantity of radiation received.

46. A cap according to claim 45, wherein the plurality of different signals include a plurality of different colors.

47. A cap according to claim 45, wherein the plurality of different signals includes a first color which is displayed after a first amount of radiation is received and a second color which is displayed after a second amount of radiation is received and wherein said second amount is greater than said first amount.

48. A cap according to claim 47, wherein the plurality of different signals further includes a third color which is displayed after a third amount of radiation is received and wherein said third amount is greater than said second amount.

49. A cap according to claim 48, wherein the indicator includes a plurality of display elements.

50. A cap according to claim 49, wherein said plurality of display elements are arranged in a row, and wherein each of said plurality display elements displays one of said first, second, and third colors.

51. A cap according to claim 50, wherein at least one of said first, second, and third colors is displayed by more than one of said plurality of display elements.

52. A cap according to claim 51, wherein said indicator is disposed on said first visor.

53. A cap according to claim 41, wherein said indicator is disposed on said first visor.

54. A cap according to claim 53, wherein said signal is a visual signal.

55. A cap according to claim 53, wherein said signal is an audible signal.

56. A device according to claim 41, wherein the at least one sensor includes a photovoltaic cell that converts solar radiation into electric current that heats a thermochromic system which, changes color as a function of temperature change.

57. A device according to claim 41, wherein the means to generate a signal includes a computer that determines when a quantity of radiation has been received by the individual based on a sun protection factor entered into the computer and a quantity of radiation received by the detection means, wherein when the computer determines a specified quantity of radiation has been received, the computer generates a signal detectable by the individual.

58. A device according to claim 41, wherein the means to generate a signal generates a change in color in an area of the at least one sensor, and the color change is reversible.

59. A device according to claim 41, wherein the means to generate a signal includes a plurality of zones, each zone includes compositions based on mixtures of different liquid crystals, and each zone is configured to react to different temperatures and to create a signal when a different quantity of infrared radiation is received by the detecting means.

* * * * *